Dec. 12, 1939.  W. S. WOLFRAM  2,183,001
FRICTION CLUTCH
Filed Feb. 27, 1939
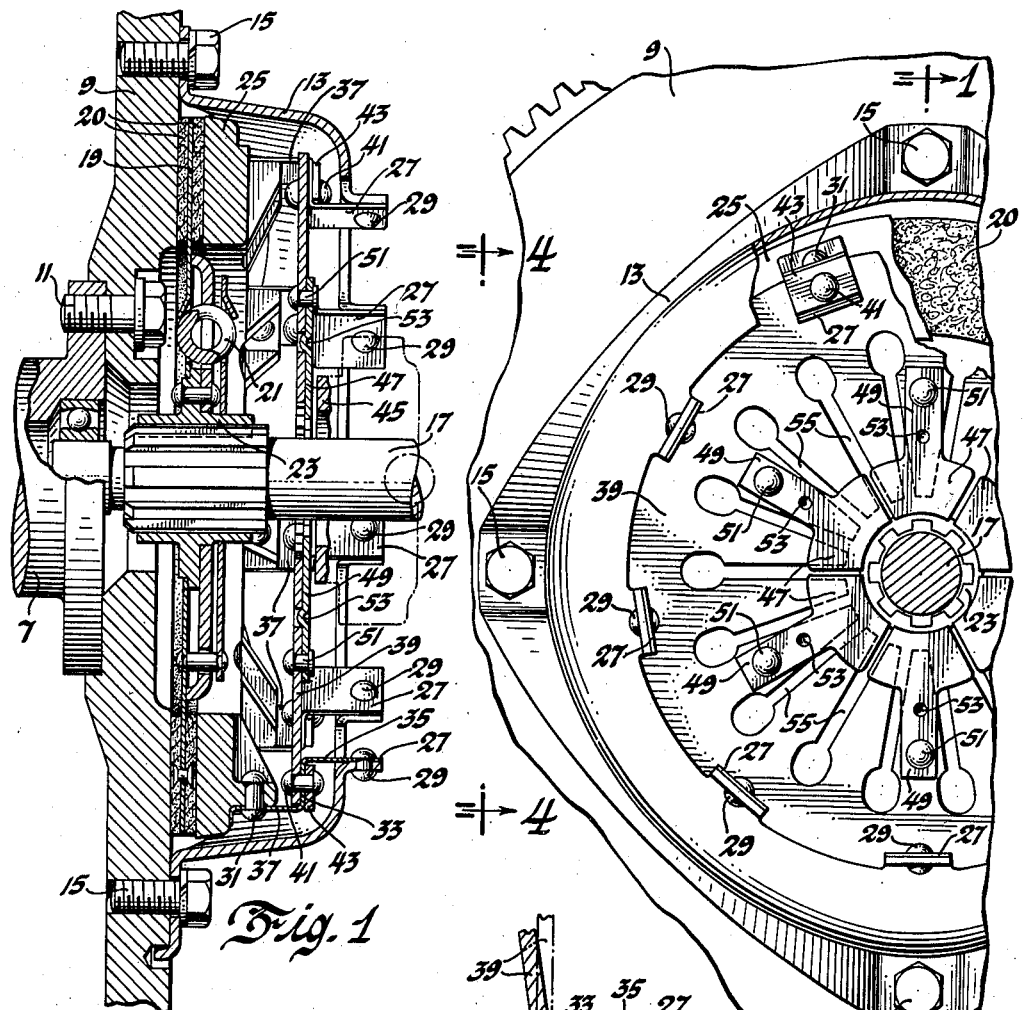
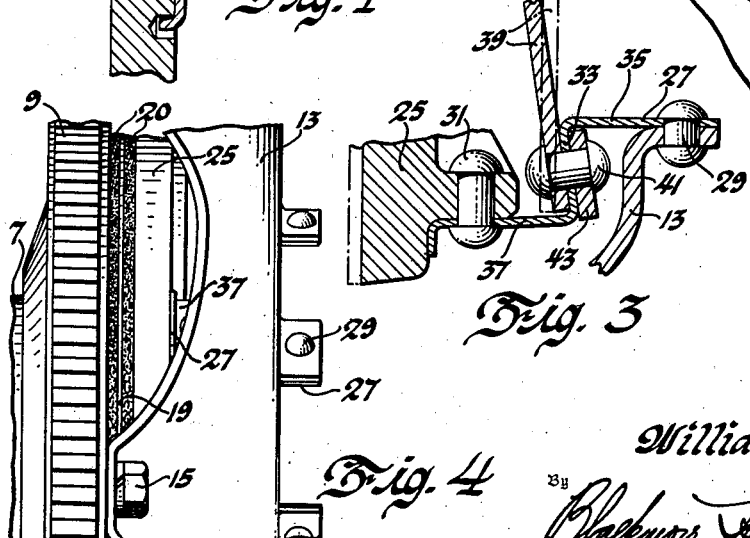
Fig. 1
Fig. 2
Fig. 3
Fig. 4
Inventor
William S. Wolfram
By Blackmore, Spencer & Hunt
Attorneys Patented Dec. 12, 1939

2,183,001

UNITED STATES PATENT OFFICE 2,183,001

FRICTION CLUTCH

William S. Wolfram, Dayton, Ohio, assignor to General Motors Corporation, Detroit, Mich., a corporation of Delaware Application February 27, 1939, Serial No. 258,646

4 Claims. (Cl. 192—68)

This invention relates to friction clutches and has been made as the result of an effort to improve the friction clutch through the instrumentality of which the engine of a motor vehicle drives the input shaft of the transmission.

In clutches of the kind referred to, there is usually provided a cover fixedly secured to but having an abutment portion spaced from the flywheel on the engine shaft. Adapted to be gripped between the face of the flywheel and an axially movable pressure plate is the driven plate. A suitable spring in abutment with the cover plate biases the pressure plate to its active position. Means is provided to release the pressure plate from the action of the spring and also yielding means is provided to reciprocate the pressure plate away from the flywheel when the clutch is to be released. The present invention relates to this kind of clutch and it includes an improvement in the mounting of the clutch engaging spring and the parts associated therewith. It also includes improvements in the mechanism by which the pressure plate is centrally located relative to and is made to rotate with the flywheel and by which the pressure plate is moved away from the flywheel when the clutch is disengaged.

The main object of the invention is, briefly stated, to improve and simplify the clutch in the above particulars by the use of structure which shall be highly efficient, comparatively inexpensive and easy to assemble.

As a further object the invention employs a known form of Belleville spring and provides a mounting therefor which eliminates the friction between such a spring and its fulcrum contact region, which friction has been present in certain prior constructions. Other objects and advantages will be understood from the following description. On the drawing:

Figure 1 is a transverse sectional view on line 1—1 of Figure 2.

Figure 2 is a view in elevation partly broken away.

Figure 3 is a sectional view of a portion of the assembly shown in Figure 1 with parts displaced from the position they occupy in Figure 1.

Figure 4 is a view as seen from line 4—4 of Figure 2.

Referring by reference characters to the drawing, numeral 7 is applied to the engine shaft. A flywheel 9 is secured to the engine shaft by fastening means 11. A cover 13 shaped as shown is secured to the flywheel by a plurality of fastening means 15. A driven shaft 17 coaxial with shaft 7 enters the cover enclosure and carries a driven clutch plate 19, provided with facings 20. This driven plate has a torque cushioning spring connection 21 with a hub 23 mounted to rotate with shaft 17. A pressure plate 25 is adapted to be moved toward the flywheel and grip the driven plate 19.

A plurality of angular spring clips 27 distributed in a circular series are attached to the cover at 29. These clips have their opposite ends disposed at a greater radial distance than the attachments at 29 and at these greater distances are attached at 31 to the pressure plate. The pressure plate is thus centralized relative to the cover 13 and the flywheel 9. The intermediate wall 33 of the clip extends radially as shown. When the clip is unloaded this wall 33 extends at an angle to the end portions 35 and 37 as shown by full lines in Figure 3. The length of each spring clip 27 is therefore slightly less when unloaded than when the intermediate wall is at right angles to the end portions. When the clips are in the position shown by full lines in Figure 3, the pressure plate is in clutch releasing position. When in the dotted line position the clutch is engaged.

To move the pressure plate to clutch engaging position there is used a coned or Belleville spring marked 39. Its outer end is secured to the intermediate walls of the clips 27 by rivets 41, reinforcing members being shown at 43. A clutch throwout collar is shown at 45. It is adapted to engage a plurality of segments 47, which segments have radial arms 49 riveted to the Belleville spring at 51 and interengaging parts at 53. The arms extend between the slots 55 provided, as usual in this type of spring.

The Belleville spring is normally coned with its apex adjacent the collar 45. It is prestressed in assembly so that it straightens out the intermediate walls 33 of the clips 27 and forces the pressure plate to active position. As in prior usage the annular band of the spring adjacent its periphery is unbroken by slots. This band therefore has a leverage between the region at 35 and the region at 37 of the spring clips to apply the clutch. In so doing, the pressure of the spring operates through parts 37 of the spring clips and takes an abutment at the point where arms 35 of the clips are secured to the cover. When pressure is applied at the throwout sleeve the load is taken from the cover and the latent spring energy in the clip restores the intermediate wall to the angular position shown by Figure 3 and the clutch is released.

By the arrangement described the cover secured to the flywheel centers the pressure plate and spring, thus avoiding the more conventional driving lugs. In prior usage a certain amount of friction between the Belleville spring and its fulcrum was unavoidable. In the present case this friction no longer occurs. The construction is very simple and the parts are obviously inexpensive.

I claim:

1. In a clutch having a flywheel, a cover, a reciprocable pressure plate and a driven member adapted to be gripped between the flywheel and pressure plate, yielding clips having axially and radially spaced ends secured to said cover and the pressure plate and radially extending intermediate parts, plate spring means adapted to effect clutch engagement, means to attach the outer margin of said spring means to said intermediate parts of said clips and throwout means operable upon the inner margin of said spring means.

2. The invention defined by claim 1, said spring means being in the form of a Belleville washer.

3. The invention defined by claim 1, each of said spring clips having its intermediate wall extending at an acute angle to its end walls when unloaded and adapted to be brought into right angular relation with said end walls by the clutch engaging action of the spring means.

4. The invention defined by claim 1, said throwout means including a reciprocable member and separable abutments engaged thereby, said abutment members being secured to the radially inner portions of said spring means.

WILLIAM S. WOLFRAM.